Aug. 23, 1927.

D. L. GUVIA 1,639,940

VEHICLE TIRE

Filed Nov. 2, 1925        2 Sheets-Sheet 1

INVENTOR.
BY Daniel Lar Guvia
B. Singer
ATTORNEY.

Aug. 23, 1927.
D. L. GUVIA
1,639,940
VEHICLE TIRE
Filed Nov. 2, 1925
2 Sheets-Sheet 2
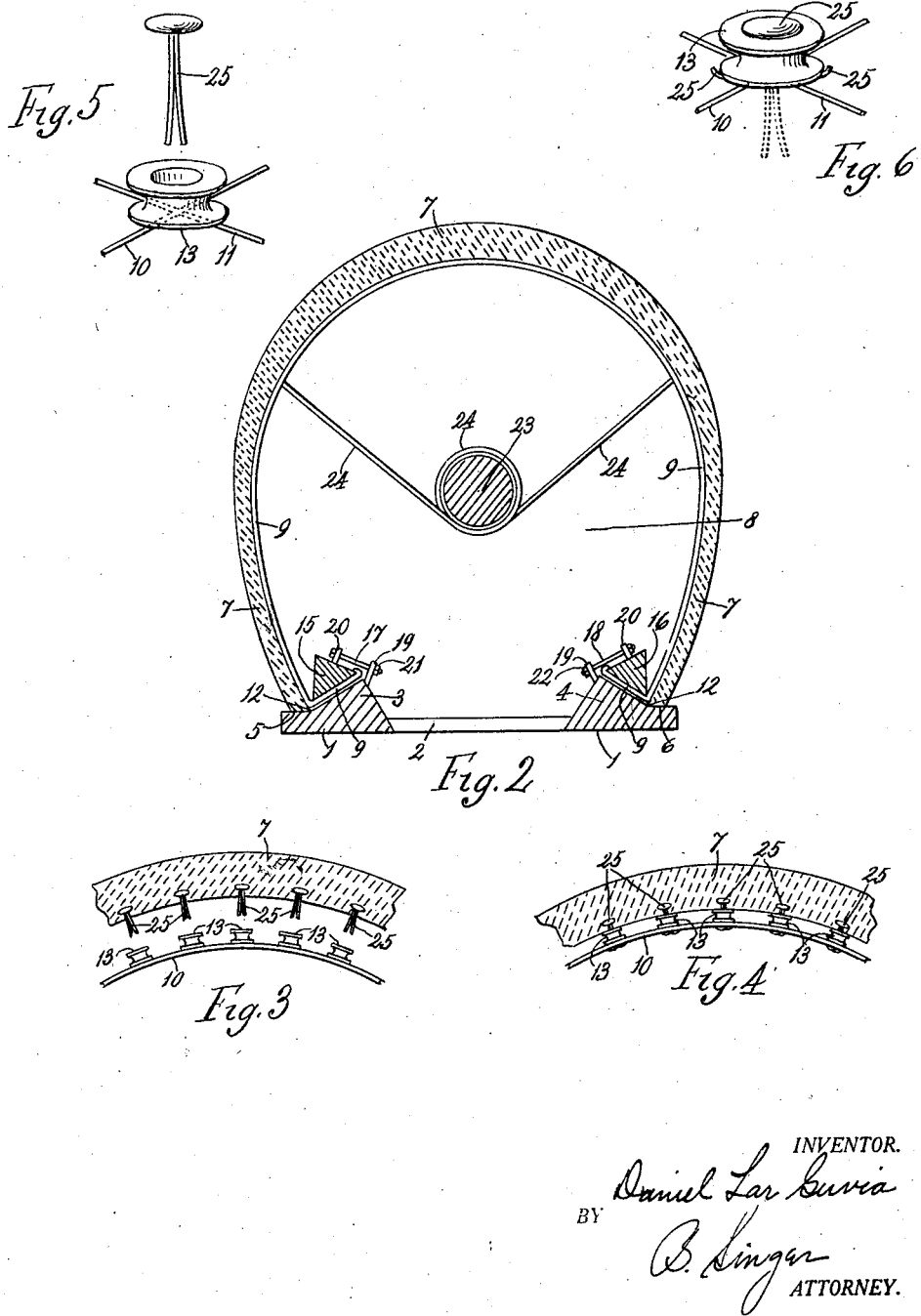
INVENTOR.
Daniel Lar Guvia
BY
B. Singer
ATTORNEY.

Patented Aug. 23, 1927.

1,639,940

UNITED STATES PATENT OFFICE.

DANIEL LAR GUVIA, OF MEXICO, MEXICO.

VEHICLE TIRE.

Application filed November 2, 1925, Serial No. 66,226, and in Mexico November 17, 1924.

This invention relates to tires for vehicles, particularly for automobiles and its object is to provide a tire without pneumatic tube, thus doing away with the accidents occasioned by the puncturing or tearing of the pneumatic tube.

Another object of the invention is to produce a vehicle tire provided with an elastic casing having a metallic frame of uniform resiliency and tension, in substitution for the pneumatic tube.

Another object of the invention is to provide a tire of longer duration than those at present in use and of less cost than the same in respect to its duration.

The invention is described with reference to the figures of the annexed drawings, in which:

Fig. 2 is a transverse section of the tire.

Fig. 3 is a detail view in transverse section of a portion of the elastic casing having a plurality of fasteners inserted in the material of the same, and spaced apart therefrom, also a portion of the inner frame.

Fig. 4 is a similar detail view to that of Fig. 3, but showing united together the portion of the casing and the portion of inner frame.

Fig. 5 is a detail representing a fastener and an eyelet intersecting the wires forming the inner frame of the casing, in separated position.

Fig. 6 is a similar detail view to that of Fig. 5 showing connected together the fastener and the eyelet.

Figure 1:
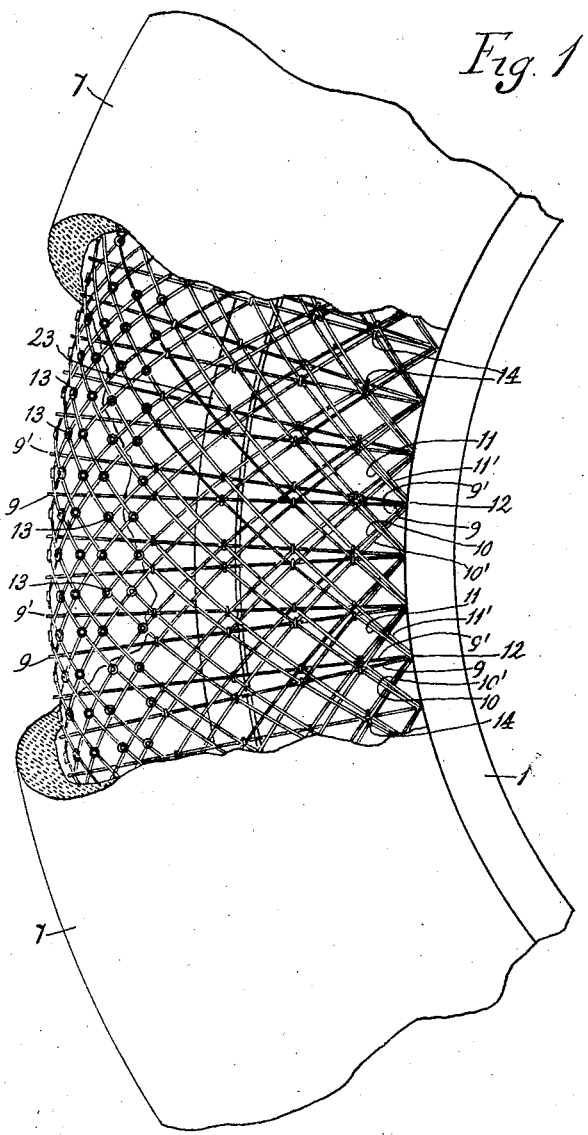
Fig. 1 is an elevation view of a fragment of the tire partially cut so as to show its inner construction.

The rim 1, which is metallic is provided at its center line with a plurality of openings 2 spaced apart from each other, and at each side of the openings 2 along the longitudinal extension of its outer face, said rim 1 has two ribs of angular section 3 and 4 which extend to the outer edge of the casing through smooth sections 5 and 6. On said smooth sections bear the edges of the elastic casing 7 which is made of elastic rubber and which is of greater thickness on the tread surface than at the side portions, and forms an inner hollow space 8. Casing 7 is mounted on a metallic inner frame which is resilient and tense and has the form of a metallic net constituted by sets of three banks of two metal wires each bank, to wit, 9, 9′, 10, 10′ and 11, 11′, each three banks leading from the respective one of the points 12 located at the same distance apart in the outer peripheral basic lines of the angular section ribs 3 and 4 of the rim 1, with the particularity that the two side banks 10, 10′ and 11, 11′ are inclined in oblique position with respect to each other and the central bank 9, 9′ takes a perpendicular direction with respect to the tangential line at each point 12, and the two wires 9, 9′ of the central bank are separated from each other from point 12 having a maximum of separation at the center line of tread of the casing, and converging then towards a point symmetrical to point 12 and located at the other side on rim 1. Likewise, the two wires of each oblique bank 10, 10′ and 11, 11′ also diverge from each other towards the center line of tread and then converge towards a point symmetrical to the point of origin 12 located at the other side of rim 1, where they join with wires of other banks of different sets. At the points of intersection of the wires of the oblique banks 10, 10′ and 11, 11′ the union of the same to each other is secured by means of eyelets 13 provided with two flanges and which are secured through welding on said wires, while on the intersecting points of the wires of the oblique banks 10, 10′ and 11, 11′ with the wires of the perpendicular banks 9, 9′, the union is effected by ties or bracket rivets 14. The end portions of wires 9, 9′, 10, 10′ and 11, 11′ which extend beyond the outer basic peripheral lines of ribs 3 and 4 are bent on the outer face of ribs 3 and 4 respectively at each side of the netting and are held in position by means of two triangular section rings which by one of their faces press the end portions of wires 9, 9′, 10, 10′ and 11, 11′ between them and the inclined outer faces of ribs 3 and 4, the rings 15 and 16 being secured to rim 1 by means of equidistant pressure regulating screws 17 and 18 which pass through holes in lugs 19 and 20 integrally connected to the inner face of ribs 3 and 4 and to the inner inclined face of rings 15 and 16, respectively, the screws 17 and 18 being secured by nuts 21 and 22.

The netting formed by the banks of wires 9, 9′, 10, 10′, and 11, 11′, is provided with a pressure compensator formed by a cylindrical metal rod 23 arranged at the axial line of the torus formed by the body of said netting and which is provided at intervals with braces 24 which are given a turn around the rod 23 and extend therefrom in divergent directions forming angles at symmetrical side points of the said netting.

The netting 9, 9', 10, 10' and 11, 11' is connected to the casing 7 by means of a plurality of fasteners 25 which have their heads embedded in the material of casing 7 when the same is moulded, leaving the branches of each fastener projecting out of the inner face of casing 7. The fasteners 25 have a similar arrangement to that of the eyelets 13 on the body of said netting, so that once the netting is formed, the casing 7 is connected to the netting by passing the branches of each fastener 25 through the corresponding hole of the eyelet 13 and by bending on the same the branches of each fastener, they are securely fixed on the wires of the netting.

In the working of the tire, the central rod 23 acts as a pressure compensator. When the casing is pressed inwardly at any point it will cause braces 24 to move to widen the angle between them and piece 23 will be pushed from inside to outside in the compressed point, which action will be counterchecked by the inactive part of the same piece 23, on being in turn acted upon by the other brackets 24 arranged on the non-compressed part of casing 7, which will cause said piece 23 to occupy its normal position as soon as the pressure on that point of the tire ceases.

It is obvious that different means from those mentioned can be used for fixing the casing to the inner metallic frame, and that the structure of the frame and the way of securing the same to the wheel rim can vary without altering the essential character of the invention, which is as set forth in the appended claims.

What I claim is:

1. A tire comprising an elastic casing arranged in close form on a rim to form an inner hollow space, a frame of strong, strengthening and yielding net arranged on the inner face of the elastic casing, and a pressure compensating member for the peripheral surface of the casing, which member is mounted at the central portion of the hollow space of the casing and is conveniently secured to its inner frame.

2. A tire comprising an elastic casing arranged in closed form on a rim to form an inner hollow space, a frame of strong, strengthening and yielding net arranged on the inner face of the elastic casing, an annular pressure compensating member for the peripheral surface of the casing which member is mounted at the center of the hollow space of the casing, and braces connecting the same with symmetrical points of the side portions of the net.

3. A tire comprising an elastic casing arranged in close form on a rim to form an inner hollow space, a frame of strong, strengthening and yielding net arranged on the inner face of the elastic casing, a cylindrical annular pressure compensating member for the peripheral surface of the casing which member is mounted at the center of the hollow space of the casing by means of braces which are coiled at its central portion on the annular cylindrical member and have their ends extended forming an angle to symmetrical points of the side portions of the net.

4. A tire comprising an elastic casing arranged in close form on a rim to form an inner hollow space, a frame of strong, strengthening and yielding net arranged on the inner face of the elastic casing, means for securing the ends of the elements of the net on the outer face of the rim, and fasteners having their heads embedded in the material of the elastic casing and their free branches passing through eyelets united to the net of the frame, and bent on the eyelets and secured to the net.

5. A tire comprising an elastic casing arranged in closed form on a rim to form an inner hollow space, a frame of metallic net arranged on the inner face of the elastic casing and formed by banks of intercrossed wires which in a predetermined number lead from points spaced apart on a side of the outer face of the rim, and which banks diverge towards the central line of the peripheral tread of the casing and then converge to the other side at symmetrical points of the rim.

6. A tire comprising an elastic casing arranged in close form on a rim to form an inner hollow space, a frame of metallic net arranged on the inner face of the elastic casing and formed by intercrossed sets of three banks of two wires each, each three bank set leading from a point on the outer face of the rim from which the central bank extends perpendicularly to the tangent of the circumference of the rim at said point and the side banks extending in opposite oblique directions converging with banks of other sets at points symmetrically located at the other side of the outer face of the rim, the two wires of each bank being divergent from the point of origin to the tread of the periphery and then converging towards another symmetrical point at the other side of the rim, eyelets fixed at the intersection points of the wires of the oblique banks, and ties connecting together the wires of the oblique banks with the wires of the perpendicular banks at their intersection points.

In witness whereof I affix my signature.

DANIEL LAR GUVIA.